Figure 1:
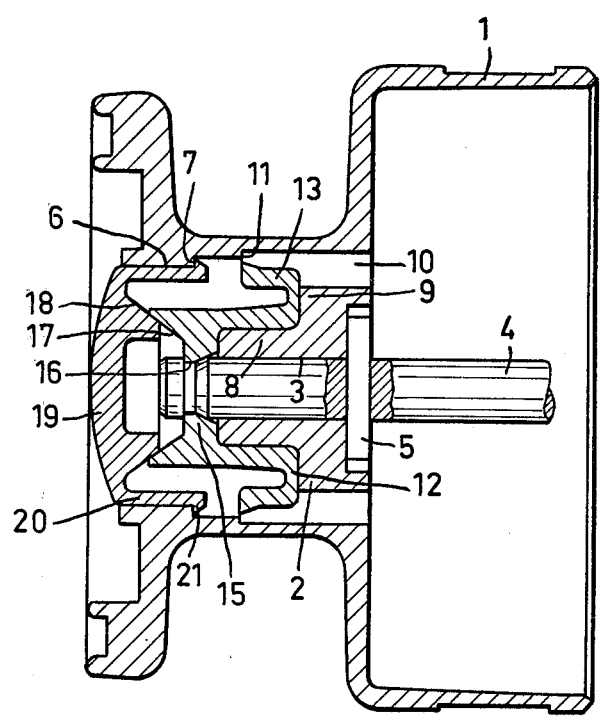

United States Patent [19]

Dörbandt

[11] 4,327,880
[45] May 4, 1982

[54] RELEASABLE SPOOL FOR FISHING REELS

[75] Inventor: Klaus Dörbandt, Berlin, Fed. Rep. of Germany

[73] Assignee: Deutsche Angelgeräte Manufactur (DAM) Hellmuth Kuntze GmbH, Berlin, Fed. Rep. of Germany

[21] Appl. No.: 247,666

[22] Filed: Mar. 26, 1981

[30] Foreign Application Priority Data

Mar. 27, 1980 [DE] Fed. Rep. of Germany ... 8008652[U]

[51] Int. Cl.³ .............................................. A01K 89/01
[52] U.S. Cl. ............................. 242/84.2 R; 242/129.5; 403/203; 403/227
[58] Field of Search .................. 242/84.2 R, 84.21 R, 242/84.1 R, 68.3, 129.5; 403/1, 203, 226, 227, 367, 372

[56] References Cited

U.S. PATENT DOCUMENTS 2,865,662 12/1958 Murmse ...................... 242/84.2 R X
3,979,082 9/1976 Morishita ...................... 242/84.2 R

FOREIGN PATENT DOCUMENTS 624294 6/1949 United Kingdom ........... 242/84.1 R

Primary Examiner—Billy S. Taylor
Attorney, Agent, or Firm—Allison C. Collard; Thomas M. Galgano

[57] ABSTRACT

A spool of a spinning reel is retained on its shaft by latch means released by an axially shiftable push button. The reel shaft has an annular latch groove near its forward end and a spool supporting hub. The spool is suitably recessed to receive and retain a crosspiece and the axially shiftable push button. The crosspiece is made of elastomeric material formed with forward sloping faces and associated radial, inwardly directed lugs shaped to be retained in the latch groove. When the spool is inserted onto the shaft the lugs drop into the latch groove to releasably retain the spool on the shaft. To remove the spool, the push button is depressed causing ramp faces thereon to engage the sloped faces of the crosspiece and withdraw the lugs from the groove freeing the spool for removal over the end of the shaft.

3 Claims, 2 Drawing Figures

RELEASABLE SPOOL FOR FISHING REELS

The present invention relates to a releasable spool for fishing rod reels which is affixed to a shaft for rotation therewith by means of a pin.

It is an object of the invention to simplify the coupling and uncoupling of the spool with the shaft by the provision of a reliable arresting mechanism between both of these parts.

This object of the invention is obtained by a spool of the aforementioned type having a shaft and a spool coupled to the shaft for rotation therewith by means of a pin, wherein the shaft has a circumferentially-extending annular groove formed therein adjacent to one end thereof, and a spool having an outer casing having a front face with a cylindrical recess formed therein, a central hub having a bore formed therethrough for receiving the shaft and a central member of reduced cross section projecting into the recess and a crosspiece interconnecting the outer casing and the hub. The crosspiece has a plurality of circumferentially-disposed, spaced-apart cylindrical bores having axes parallel to the axis of the shaft and the bores extend into the recess such that they are spaced from, but extend along, at least a portion of the central member. The bores also have a sidewall defining an inner open end thereof which merges with the outer casing to define a shoulder. In addition, the front face of the outer casing has an inner wall defining the cylindrical recess which has an offset shoulder axially spaced from the bores and radially inwardly spaced from the shoulder of the bores. Arresting means made of an elastomeric material is mounted in the recess and it has an annular-shaped base plate supported on the crosspiece. The base plate has an outer edge from which extends a plurality of resilient outer latch plates which extend axially relative to the bores and which yieldingly engage behind the shoulders of the bore in a snap-fit manner. The base plate also has an inner edge from which extends a plurality of axially-yieldable, circumferentially-disposed inner latch plates which are supported on the central member of the hub, each of which has a radially-inwardly directed arresting lug projecting therefrom which is configured for snap-fit engagement within the annular groove of the shaft when the shaft is inserted in the bore of the hub. The inner latch plates also each have a free inner end on which is formed a sloping ramp face. A push button made of an elastomeric material is displaceably mounted in the recess. The button has a resilient outer jacket having a free circumferential edge provided with a radially-outwardly extending flange which engages behind the offset shoulder of the sidewall of the recess. The push button also has a ramp face positioned and configured to engage the ramp faces of the inner latch plates upon inward displacement of the button and urge the inner latch plates to spread apart in a radially outward direction so as to thereby withdraw the arresting lugs thereof from the groove of the shaft to permit release of the shaft.

As a result of this construction, only the insertion of the shaft into the hub of the spool is required for effecting coupling. Uncoupling, on the other hand, only requires the actuation of the push button for removing the shaft from the bore.

Other objects and features of the present invention will become apparent from the following detailed description when taken in connection with the accompanying drawings which disclose one embodiment of the invention. It is to be understood that the drawings are designed for the purpose of illustration only and are not intended as a definition of the limits of the invention.

Figure 2:
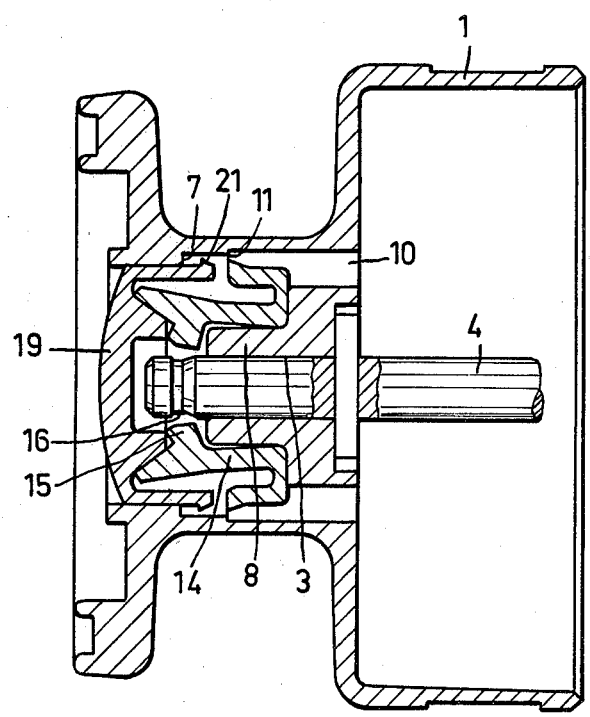

In the drawings, wherein similar reference characters denote similar elements throughout the several views:

FIG. 1 is a sectional view of a spool embodying the present invention, shown coupled with the shaft; and FIG. 2 is a sectional view comparable to the view of FIG. 1, but showing the spool uncoupled from the shaft.

Referring now in detail to the drawings, a spool 1 is provided with a hub or boss 2 having a bore 3. A shaft 4 is supported in bore 3 of hub 2 which is coupled in a fixed manner with spool 1 for rotation therewith; this being effected in a known manner by means of a transverse pin 5.

Spool 1 is provided in its free front end with a cylindrical recess 6, the wall faces of which define a radially and inwardly protruding shoulder 7. Recess 6 extends to the area of the part 8 of hub 2, which is of reduced or tapered cross section, so that a crosspiece 9 is formed between hub 2 and the outer casing of spool 1. Four cylindrical bores 10 are distributed over the circumference of crosspiece 9 which project into recess 6, so that shoulders 11 are formed which are disposed in an axially-spaced apart manner away from shoulder 7.

An arresting means made of elastomeric material is inserted into recess 6. The arresting means includes an annular-shaped base plate 12 which is supported on crosspiece 9 of spool 1. Base plate 12 is provided at its outer edge with resilient tongues or latch plates 13 which are disposed in an axially-extending and circumferentially-spaced apart manner relative to bores 10 and which engage in a snap-fit manner behind a shoulder 11 formed by bores 10.

Axially yielding or resilient tongues or latch plates 14 are distributed over the inner edge of base plate 12 which are supported on the reduced central member 8 of hub 2. These yielding latch plates are provided with arresting shoulders or lugs 15. Lugs 15 engage into a correspondingly profiled annular groove 16 of shaft 14 when the shaft is inserted into bore 3, whereby the axial arresting of shaft 14 with respect to spool 1 is effected.

On the free end of the inner latch plates 14, sloped ramp faces 17 are formed which cooperate with a ramp face 18 of a push button 19 which is made of an elastomeric material. Push button 19 has a resilient or yielding outer jacket 20 on the circumferential edge of which outwardly-extending shoulders or lugs 21 are formed which engage behind shoulder 7 of recess 6.

The arresting member is inserted into recess 6 and is fixedly installed within spool 1 by the snap action of its outer latch plates 13 behind shoulders 11. Thereafter, push button 19 is inserted until its lugs 21 snap behind shoulder 7. At this point, push button 19 is axially displaceable within recess 6 but is prevented from falling out of spool 1.

When shaft 4 is introduced into bore 3, its end spreads apart inner latch plates 14 and the arresting lugs 15 drop into annular groove 16, thus coupling shaft 4 and spool 1, as shown in FIG. 1. For releasing this coupling, push button 19 is pushed down and assumes the position shown in FIG. 2, whereby ramp face 18 spreads apart the inner latch plates 14, so that the arresting lugs 15 release shaft 4, which now can be removed from bore 3.

Thus, while only one embodiment of the present invention has been shown and described, it will be obvious that many changes and modifications may be made thereunto, without departing from the spirit and scope of the invention.

What is claimed is:

1. In a releasable spool assembly for a fishing rod reel of the type having a shaft and a spool coupled to said shaft for rotation therewith by means of a pin, the improvement comprising:

said shaft having a circumferentially-extending annular groove formed therein adjacent one end thereof;

said spool having an outer casing having a front face with a cylindrical recess formed therein, a central hub having a bore formed therethrough for receiving the shaft and a central member projecting into said recess and a crosspiece interconnecting said outer casing and said hub;

said crosspiece having a plurality of circumferentially-disposed, spaced-apart cylindrical bores having axes parallel to the axis of said shaft, said bores extending into said recess such that they are spaced from, but extend along, at least a portion of said central member, said bores having a sidewall defining an inner open end thereof which merges with said outer casing to define a shoulder;

said front face of said outer casing having an inner wall defining said cylindrical recess which has an offset shoulder axially spaced from said bores and radially inwardly spaced from said shoulder of said bores;

arresting means mounted in said recess having an annular-shaped base plate supported on said crosspiece, said base plate having an outer edge from which extends a plurality of resilient outer latch plates which extend axially relative to said bores and which yieldingly engage behind said shoulders of said bore in a snap-fit manner, said base plate also having an inner edge from which extends a plurality of axially-yieldable circumferentially-disposed inner latch plates which are supported on said central member of said hub, each of which has a radially-inwardly directed arresting lug projecting therefrom which is configured for snap-fit engagement within said annular groove of said shaft when said shaft is inserted in said bore of said hub, said inner latch plates also each having a free inner end on which is formed a sloping ramp face; and a push button displaceably mounted in said recess, said button having a resilient outer jacket having a free circumferential edge provided with a radially-outwardly extending flange which engages behind said offset shoulder of said sidewall of said recess, said push button also having a ramp face positioned and configured to engage said ramp faces of said inner latch plates upon inward displacement of said button and urge said inner latch plates to spread apart in a radially outward direction so as to thereby withdraw said arresting lugs thereof from said groove of said shaft to permit release of said shaft.

2. The spool assembly according to claim 1, wherein said arresting means and said push button are made of an elastomeric material.

3. The spool assembly according to claim 1, wherein said central member is of reduced cross section relative to the remainder of said hub.

* * * * *